(12) United States Patent
Bartfai et al.

(10) Patent No.: US 8,341,366 B2
(45) Date of Patent: *Dec. 25, 2012

(54) SPLITTING WRITES BETWEEN A STORAGE CONTROLLER AND REPLICATION ENGINE

(75) Inventors: Robert Francis Bartfai, Tucson, AZ (US); Kenneth Wayne Boyd, Tucson, AZ (US); James Chien-Chiung Chen, Tucson, AZ (US); Kenneth Fairclough Day, III, Tucson, AZ (US); Shachar Fienblit, Ein Ayala (IL); Gregory Edward McBride, Tucson, AZ (US); David W. Messina, Poughkeepsie, NY (US); Robert Bruce Nicholson, Southsea (GB); Gail Andrea Spear, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/356,568

(22) Filed: Jan. 23, 2012

(65) Prior Publication Data

US 2012/0124310 A1   May 17, 2012

Related U.S. Application Data

(63) Continuation of application No. 11/840,169, filed on Aug. 16, 2007, now Pat. No. 8,131,957.

(51) Int. Cl.
*G06F 12/00* (2006.01)

(52) U.S. Cl. ............... 711/162; 711/161; 711/E12.103; 707/633; 707/659

(58) Field of Classification Search .................. None
See application file for complete search history.

(56) References Cited

U.S. PATENT DOCUMENTS 5,680,580 A   10/1997   Beardsley et al.
(Continued)

FOREIGN PATENT DOCUMENTS

JP   2000339104   12/2000
(Continued)

OTHER PUBLICATIONS

PCT Invitation to Pay Additional and, Where Applicable, Protect Fee dated Dec. 9, 2008 for Application No. PCT/EP2008-060573 filed Aug. 12, 2008.

(Continued)

*Primary Examiner* — Michael Krofcheck
(74) *Attorney, Agent, or Firm* — David W. Victor; Konrad Raynes Davda & Victor LLP

(57) ABSTRACT

Provided are a method, system, and article of manufacture for splitting writes between a storage controller and replication engine. A splitter executing in a storage controller manages access to primary volumes. An initialization command is received to communicate with a replication engine. A replication command is received for one primary volume and the primary volume is indicated as subject to replication. A write request is received to write data to a target primary volume of the primary volumes that is indicated as subject to the replication. The data in the write request is written to the target primary volume. The data in the write request is sent to the replication engine. The replication engine executes a copy services function associated with the target primary volume to write the data to a replication engine volume.

20 Claims, 9 Drawing Sheets

Primary Volume Metadata (Splitter)

U.S. PATENT DOCUMENTS

| | | | |
|---|---|---|---|
| 6,728,849 | B2 | 4/2004 | Kodama |
| 6,865,617 | B2 | 3/2005 | Zeidner et al. |
| 6,880,052 | B2 | 4/2005 | Lubbers et al. |
| 6,941,396 | B1 | 9/2005 | Thorpe et al. |
| 6,941,490 | B2 | 9/2005 | Ohran |
| 7,133,985 | B1 | 11/2006 | Haase et al. |
| 7,213,116 | B2 | 5/2007 | Osaki et a |
| 7,441,095 | B2 | 10/2008 | Tamura et al. |
| 7,506,040 | B1 | 3/2009 | Rabe et al. |
| 8,024,534 | B2 | 9/2011 | Bartfai et al. |
| 2003/0028723 | A1 | 2/2003 | Segev et al. |
| 2003/0126247 | A1 | 7/2003 | Strasser et al. |
| 2004/0221103 | A1 | 11/2004 | Morishita et al. |
| 2004/0230704 | A1 | 11/2004 | Balasubramanian et al. |
| 2004/0260899 | A1 | 12/2004 | Kern et al. |
| 2005/0055523 | A1 | 3/2005 | Suishu et al. |
| 2005/0108565 | A1 | 5/2005 | Blea et al. |
| 2005/0149578 | A1 | 7/2005 | Sustman et al. |
| 2006/0015779 | A1 | 1/2006 | Nissan-Messing et al. |
| 2006/0047626 | A1* | 3/2006 | Raheem .............................. 707/2 |
| 2006/0139697 | A1 | 6/2006 | Fuente |
| 2006/0174076 | A1 | 8/2006 | Takeda et al. |
| 2006/0179343 | A1* | 8/2006 | Kitamura ........................... 714/6 |
| 2006/0236047 | A1 | 10/2006 | Shitomi |
| 2007/0113004 | A1 | 5/2007 | Sugimoto |
| 2009/0049251 | A1 | 2/2009 | Bartfai |
| 2009/0049252 | A1 | 2/2009 | Bartfai |

FOREIGN PATENT DOCUMENTS

| | | |
|---|---|---|
| JP | 2003534749 | 11/2003 |
| JP | 2004516580 | 6/2004 |
| JP | 2004192133 | 7/2004 |
| JP | 2005107645 | 4/2005 |
| JP | 2005017815 | 8/2005 |
| JP | 2005217815 | 8/2005 |
| JP | 2006268829 | 10/2006 |
| WO | 2005048124 | 5/2005 |

OTHER PUBLICATIONS

PCT International Search Report and Written Opinion dated Feb. 16, 2009 for Application No. PCT/EP2008-060573 filed Aug. 12, 2008.
First Office Action dated Mar. 29, 2010, pp. 1-20, for U.S. Appl. No. 11/840,169, by inventors R.F. Bartfai, et al. (18.210).
Response dated Jun. 29, 2010, pp. 1-19, to First Office Action dated Mar. 29, 2010, pp. 1-20, for U.S. Appl. No. 11/840,169, by inventors R.F. Bartfai, et al. (18.210).
Second Office Action dated Sep. 29, 2010, pp. 1-19, for U.S. Appl. No. 11/840,169, by inventors R.F. Bartfai, et al. (18.210).
Response dated Dec. 15, 2010, pp. 1-15, to Second Office Action dated Sep. 29, 2010, pp. 1-19, for U.S. Appl. No. 11/840,169, by inventors R.F. Bartfai, et al. (18.210).
Final Office Action dated Mar. 17, 2011, pp. 1-19, for U.S. Appl. No. 11/840,169, by inventors R.F. Bartfai, et al. (18.210).
Response dated Jun. 17, 2011, pp. pp. 1-17, to Final Office Action dated Mar. 17, 2011, pp. 1-19, for U.S. Appl. No. 11/840,169, by inventors R.F. Bartfai, et al. (18.210).
Notice of Allowance dated Oct. 26, 2011, pp. 1-11, for U.S. Appl. No. 11/840,169, by inventors R.F. Bartfai, et al. (18.210).
First Office Action dated Mar. 31, 2010, pp. 1-19, for U.S. Appl. No. 11/840,179, by inventors R.F. Bartfai, et al. (18.230).
Response dated Jul. 1, 2010, pp. 1-19, to First Office Action dated Mar. 31, 2010, pp. 1-19, for U.S. Appl. No. 11/840,179, by inventors R.F. Bartfai, et al. (18.230).
Final Office Action dated Sep. 21, 2010, pp. 1-18, for U.S. Appl. No. 11/840,179, by inventors R.F. Bartfai, et al. (18.230).
Response dated Dec. 6, 2010, pp. 1-17, to Final Office Action dated Sep. 21, 2010, pp. 1-18, for U.S. Appl. No. 11/840,179, by inventors R.F. Bartfai, et al. (18.230).
Notice of Allowance dated Mar. 18, 2011, pp. 1-6, for U.S. Appl. No. 11/840,179, by inventors R.F. Bartfai, et al. (18.230).
English machine translation of JP2004192133 filed Jul. 8, 2004.
English machine translation of JP2005217815 filed Aug. 11, 2005.
"Information Materials for IDS" dated Jul. 19, 2012, pp. 1-2, regarding JP Office Action dated Jun. 19, 2012.
English machine translation of JP2000339104 filed Dec. 8, 2000.

* cited by examiner

SPLITTING WRITES BETWEEN A STORAGE CONTROLLER AND REPLICATION ENGINE

RELATED APPLICATION

This patent application is a continuation of U.S. patent application Ser. No. 11/840,169, filed on Aug. 16, 2007, which patent application is incorporated herein by reference in its entirety.

BACKGROUND OF THE INVENTION

1. Field of the Invention

The present invention relates to a method, system, and article of manufacture for splitting writes between a storage controller and replication engine.

2. Description of the Related Art

In current network storage systems, a splitter can be implemented in a host or a switch to split writes directed to a volume managed by a storage controller to another storage device. The splitter sends a copy of the data to the storage controller and another copy to a replication engine that implements copy services to copy the data to a storage. The replication engine may comprise a separate network device or appliance.

In one implementation, a splitter is implemented in the host software stack, such as the device driver or logical volume manager. In another implementation, the splitter may be implemented in the fabric, such as in a switch. In a yet further implementation, the splitter and the replication function are implemented within the storage controller, such as the case with Peer-to-Peer-Copy ("PPRC"), where a primary storage controller continuously mirrors or replicates data to a remote secondary site.

SUMMARY

Provided are a method, system, and article of manufacture for splitting writes between a storage controller and replication engine. A splitter executing in a storage controller manages access to primary volumes. An initialization command is received to communicate with a replication engine. A replication command is received for one primary volume and the primary volume is indicated as subject to replication. A write request is received to write data to a target primary volume of the primary volumes that is indicated as subject to the replication. The data in the write request is written to the target primary volume. The data in the write request is sent to the replication engine. The replication engine executes a copy services function associated with the target primary volume to write the data to a replication engine volume.

In a further embodiment, the replication engine and splitter communicate by packaging commands and data in a standard storage communication protocol package for transmission.

In a further embodiment, there are a plurality of replication engines each implementing heterogeneous copy functions from different vendors. The splitter is capable of using a same set of commands and the standard storage communication protocol to communicate with the different replication engines to invoke the heterogeneous copy functions.

In a further embodiment, complete is returned to the write request in response to receiving acknowledgment that the write completed at both the primary volume and at the replication engine volume.

In a further embodiment, a failure in communicating with the replication engine is detected. Indications of writes to the primary volume that occur following the detected failure are recorded in a record change data structure. A request is received from the replication engine for the record change data structure. Information on changed data in the record change data structure is sent to the replication engine. The record change data structure is cleared in response to sending the record change data structure to the replication engine.

In a further embodiment, a request is received from the replication engine for updated data in the primary volume indicated in the record change data structure. The requested updated data indicated in the record change data structure is sent to the replication engine.

In a further embodiment, indication is received of a region to copy from the replication engine to the primary volume. A request is made from the replication engine for data indicated in the region. Data from the replication engine indicated in the region is received and the received data indicated in the region is written to the primary volume. Indication is made that the data in the region was written to the primary in response to writing the data received from the replication engine to the primary volume.

In a further embodiment, a read request to data in the primary volume is received after receiving the list of regions. A determination is made as to whether the read requested data is indicated in the list. The read request is redirected to the replication engine in response to determining that the read requested data is indicated in the list. The read requested data is returned from the primary volume in response to determining that the read requested data is not indicated in the list.

In a further embodiment, a write request to write data to the primary volume is received after receiving the region. A determination is made as to whether the data to write is indicated in the region. Indication is made that the data from the write request in the region was written to the primary volume in response to writing the data to the primary volume.

In a further embodiment, indication is received of a region to copy from the primary volume to the replication engine. Data is sent from the indicated region to the replication engine and indication is made that the data in the region was sent to the replication engine in response to sending the data indicated in the region to the replication engine.

In a further embodiment, a command is received to create a virtual primary volume associated with a replication engine volume. A virtual primary volume accessible to a host is created. An Input/Output (I/O) request directed to the virtual primary volume is received and the I/O request is redirected to the replication engine.

In a further embodiment, the replication engine executes an additional function associated with the target primary volume.

DETAILED DESCRIPTION

Figure 1:
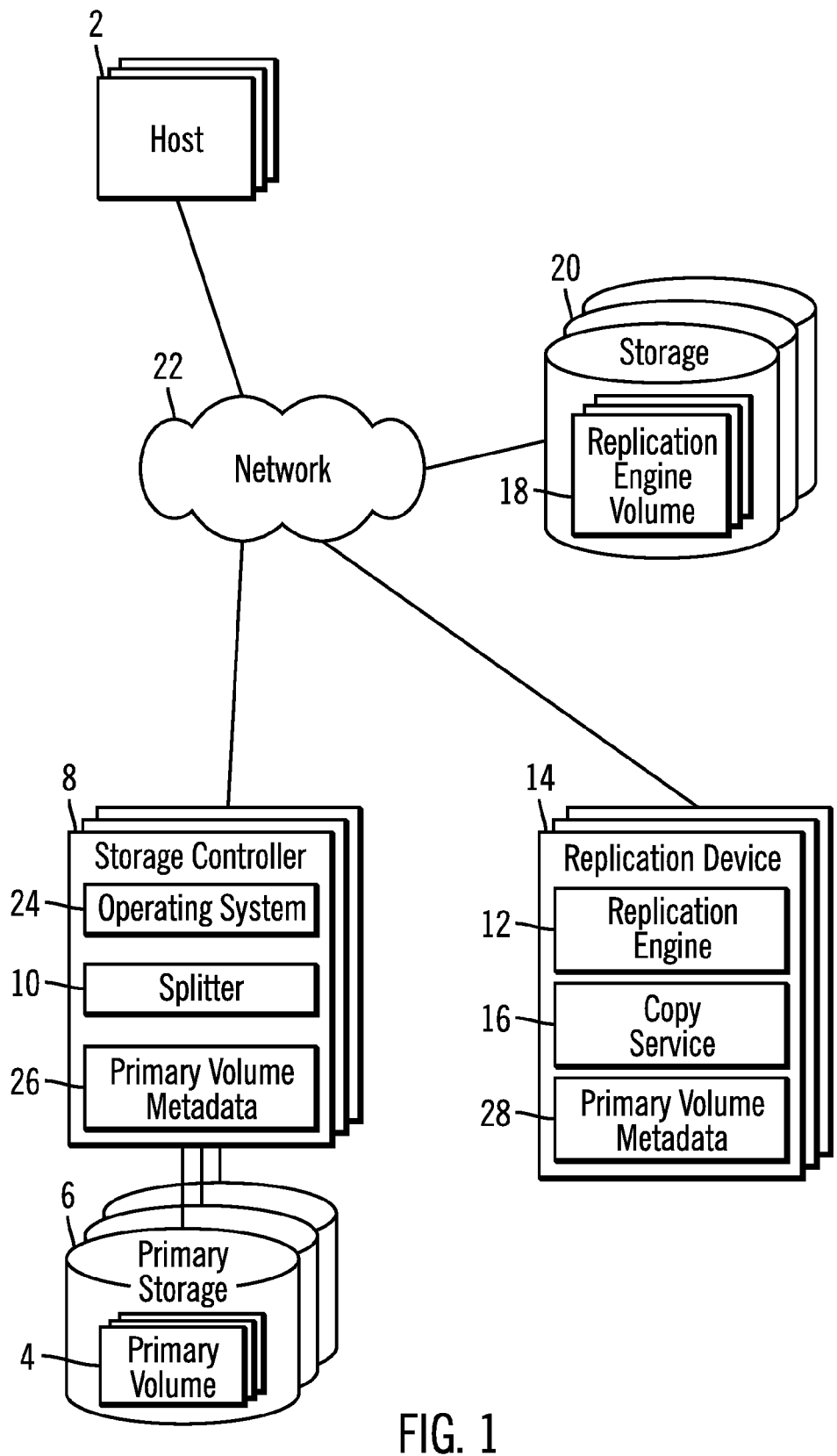
FIG. 1 illustrates an embodiment of a network computing environment.

FIG. 1 illustrates an embodiment of a network computing environment. One or more hosts 2 send read/write requests for primary volumes 4 in one or more primary storages 6. One or more storage controllers 8 manage Input/Output (I/O) access from the hosts 2 to the primary volumes 4. The storage controllers 8 may include a splitter program 10 to copy write data to the primary volumes 4 to one or more replication engines 12 implemented in replication devices 14. Each replication engine 12 may invoke a copy service 16 to copy data received from the splitter 10 to replication engine volumes 18 maintained by the replication engine 12 in a storage 20. In further embodiments, the replication engine 12 may implement the copy services function in a manner that does not involve copying, such as by creating a log and logging write data to the log.

The hosts 2, storage controllers 8, and replication devices 14 may communicate over a network 22. The network 22 may comprise a Storage Area Network (SAN), Local Area Network (LAN), Intranet, the Internet, Wide Area Network (WAN), peer-to-peer network, wireless network, arbitrated loop network, etc. The storages 6 and 20 may comprise a single storage device, such as a hard disk drive, Flash Memory, etc or an array of storage devices, such as a Just a Bunch of Disks (JBOD), Network Attached Storage (NAS), hard disk drive, Direct Access Storage Device (DASD), Redundant Array of Independent Disks (RAID) array, virtualization device, tape storage, flash memory, etc.

In the embodiment of FIG. 1, the replication engine 12 is shown as implemented in separate device from the storage controller 8. In an alternative embodiment, the replication engine 12 may be implemented within the same system as the storage controller 8. For instance, the replication device 14 and storage controller 8 may comprise separate Logical Partitions (LPARs) in a same box or system. Alternatively, the replication engine 14 and storage controller 8 may comprise expansion cards inserted into different slots of a same motherboard. In such implementations, the replication device 14 and storage controller 18 may communicate using standard protocols other than a network protocol, such as a bus communication protocol, e.g., the Peripheral Component Interconnect (PCI) protocol and architecture.

Figure 2:
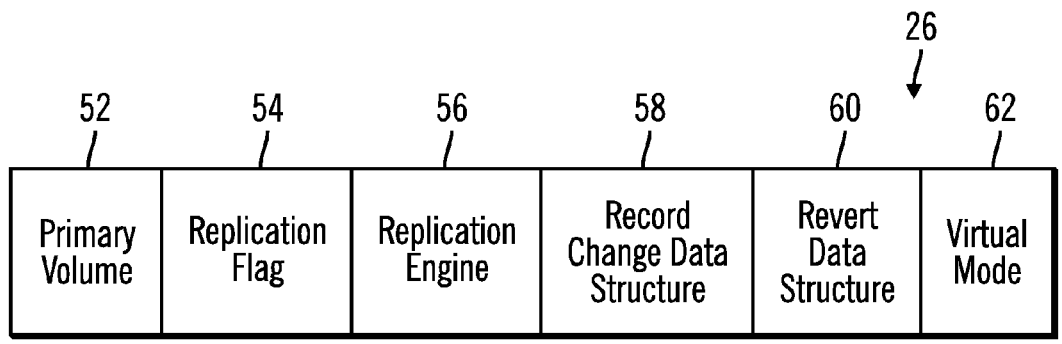
FIG. 2 illustrates an embodiment of primary volume metadata maintained by a splitter.

FIG. 2 illustrates an embodiment of the primary volume metadata 26 the storage controller 8 maintains for one primary volume. The primary volume metadata 26 may include information indicating a primary volume 52; a replication flag 54 indicating whether the primary volume 52 is to be replicated to an identified replication engine 56; a change record data structure 58 used to record changes to a primary volume being replicated while communication between the storage controller 8 and replication device 14 is disabled; a revert data structure 60 identifying regions in a the primary volume 52 to be updated with data from the replication engine 12; and virtual mode information 62 indicating whether the primary volume 52 is a virtual volume in the primary storage 6 whose data is maintained in an associated replication engine volume 18. A virtual primary volume is created to expose a replication engine volume 18 to the hosts 2 as a primary volume managed by the storage controller 8.

Figure 3:
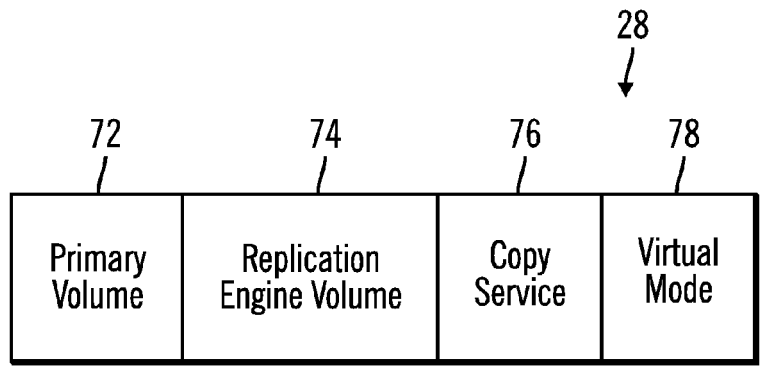
FIG. 3 illustrates an embodiment of primary volume metadata maintained by a replication engine.

FIG. 3 illustrates an embodiment of the primary volume metadata 28 the replication engine 12 maintains for one primary volume 4. The primary volume metadata 28 includes primary volume 72 information identifying one primary volume 4; a replication engine volume 74 used to store data for the corresponding primary volume 72; a copy service 76 that the replication engine 12 invokes to store data for the primary volume 72 in the replication engine volume 74; and virtual mode 78 information indicating whether the primary volume 72 is a virtual volume in the primary storage 6.

Figure 4:
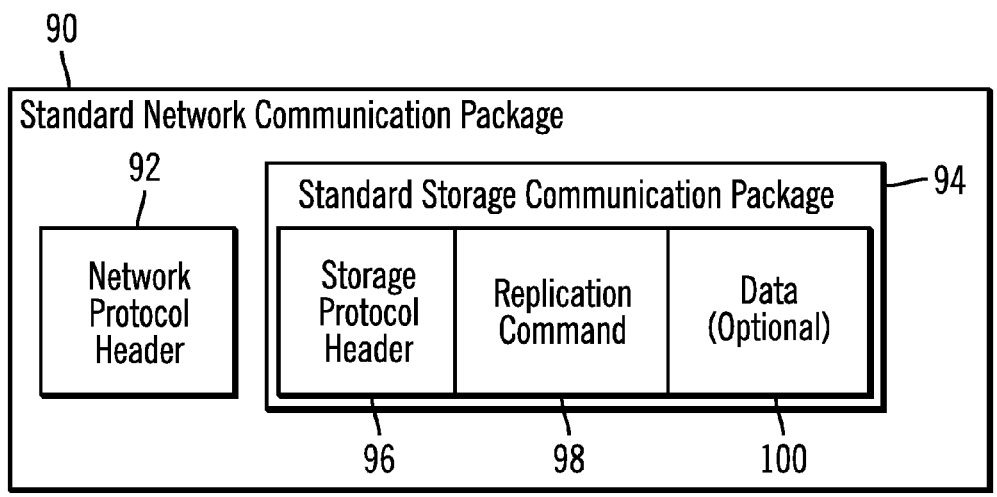
FIG. 4 illustrates an embodiment of how replication commands are packaged in communication protocols.

FIG. 4 illustrates an embodiment of how commands are communicated between the storage controllers 8 to one replication engine 12. The splitter 10 and replication engine 12 may cause the construction of a standard network communication package 90 having a network protocol header 92 according to a standard network communication protocol such as Fibre Channel, Ethernet, Serial Attached SCSI (SAS), etc. A standard storage communication package 94 may be encapsulated in the network communication package 90 with a storage protocol header 96 using a standard storage communication protocol, such as a Small Computer System Interface (SCSI). A replication command/message 98 may be included in the standard storage communication package 94 to implement the replication related operations, messages, and communications and, optionally, data 100.

In one embodiment, splitters 10 and replication engines 12 from different vendors comprising heterogeneous and, perhaps, incompatible programs, may implement the same set of replication commands to enable communication and replication operations between heterogeneous splitters and replication engines from different vendors. In this way, a splitter or replication engine vendor may incorporate the replication command set into their products to allow communication with heterogeneous splitters and replication engines from different vendors that also implement the command set. Further, different replication engines 12 may implement different copy services 16 from different vendors to enable heterogeneous splitters 12 to invoke heterogeneous copy services 16 from different vendors through the replication engines 12 that support the copy services 16.

Figure 5:
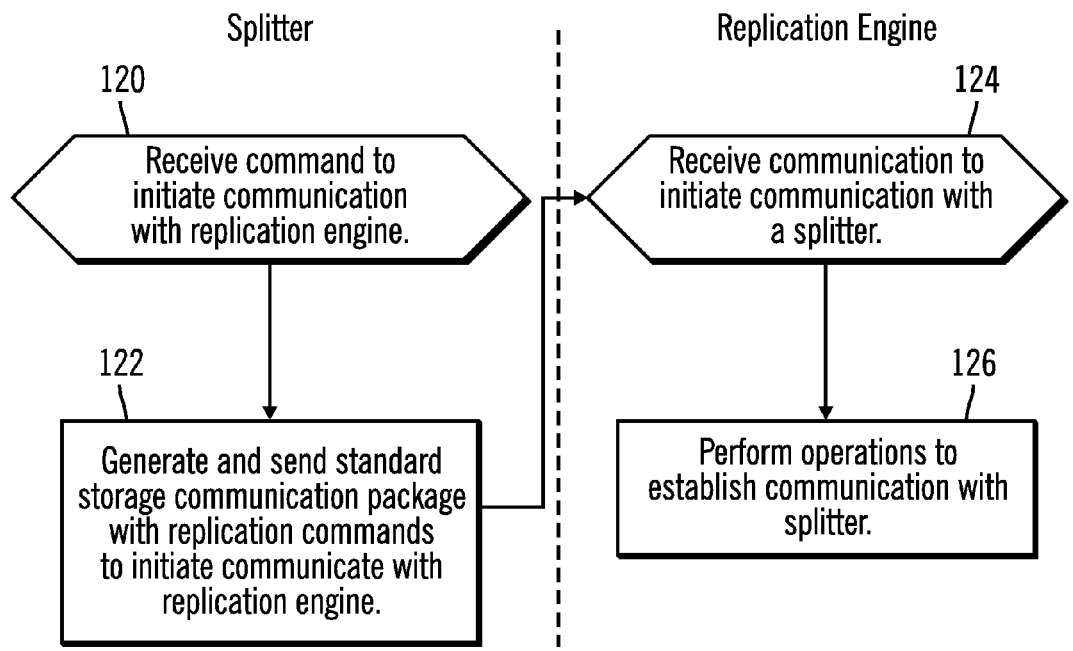
FIG. 5 illustrates an embodiment of operations to initiate communication between the splitter and the replication engine.

FIG. 5 illustrates an embodiment of operations performed by the splitter 10 and replication engine 12 to initialize communication. The splitter 10 receives (at block 120) a command 98, which may be included in the package 90 and 94 (FIG. 4), to initiate communication with the replication engine 12. The splitter 10 may receive this command via a user interface or command line of the storage controller 8. In response, the splitter 10 generates (at block 122) and sends a standard storage communication package 94, which may be encapsulated within a network communication package 90, with replication commands 98 and messages to initiate communicate with the replication engine 12. Upon receiving (at block 124) the replication communications to initiate communication with a splitter 10, the replication engine 12 performs operations (at block 126) to establish communication with the splitter 10, by sending further messages 98 to the splitter 10.

Figure 6:
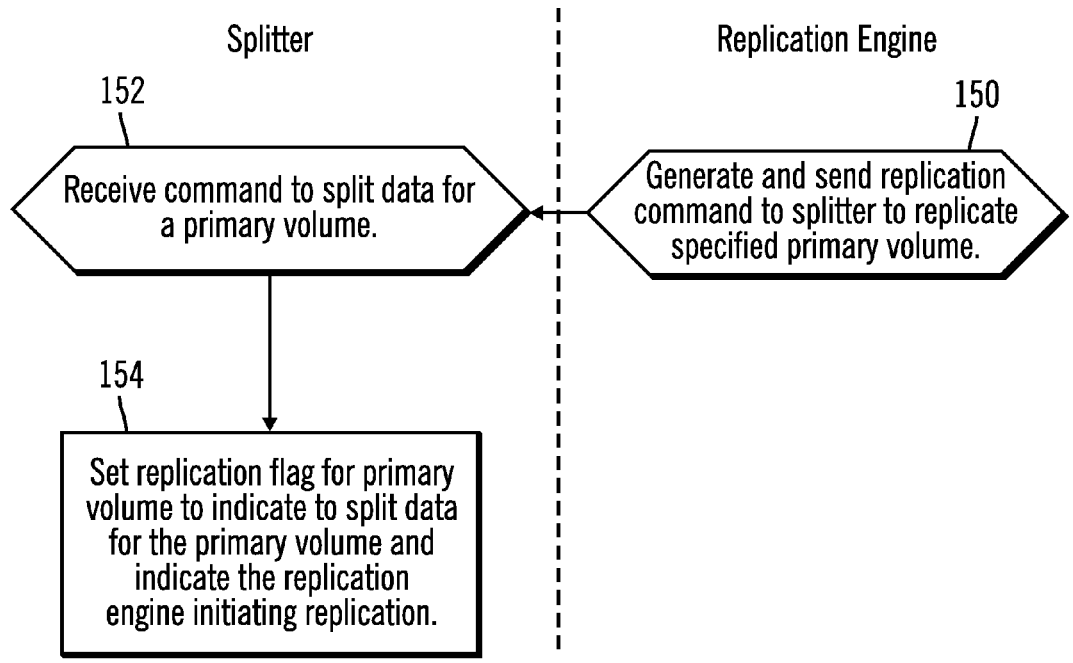
FIG. 6 illustrates an embodiment of operations to configure the splitter to split writes to the replication engine.

FIG. 6 illustrates an embodiment of operations performed by the splitter 10 and replication engine 12 to place a primary volume 4 in a replication relationship. In one embodiment, a user at a user interface of the replication device 14 invokes the replication engine 12 to generate and send (at block 150) a replication command 98 to the splitter 10 to replicate a specified primary volume 4. Upon receiving (at block 152) the replication command 98, the splitter 10 sets (at block 154) the replication flag 54 for the specified primary volume 52 to indicate to split data for the primary volume 52 to the identified replication engine 56, which may comprise the replication engine 12 that sent the replication command or another specified replication engine.

Figure 7:
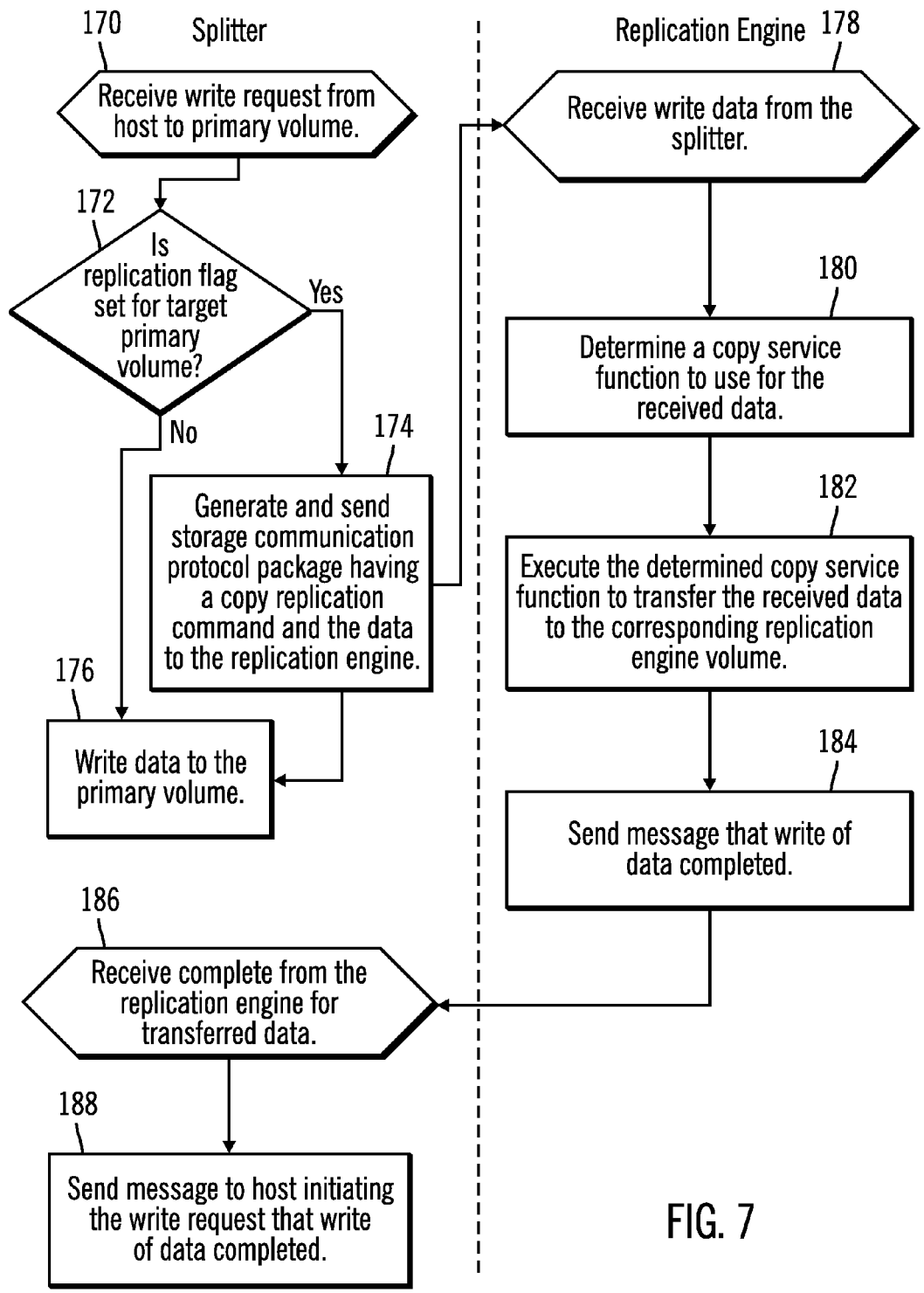
FIG. 7 illustrates an embodiment of operations to process a write request to a primary volume to split to the replication engine.

FIG. 7 illustrates an embodiment of operations performed by the splitter 10 and replication engine 12 to process a write request to a primary volume 4. Upon receiving (at block 170) a write request from a host 2 to a primary volume 4, the splitter 10 determines (at block 172) whether the replication flag 54 (FIG. 2) for the target primary volume 52 indicates replication. If replication is set, then the splitter 10 generates and sends (at block 174) a storage communication protocol package 94, which may be further included in a standard network communication package 90, including a copy replication command 98 and the write data 100 to the replication engine 12, which may comprise the replication engine 56 identified for the target primary volume. From the no branch of block 172 or from block 174, the splitter 10 writes (at block 176) the data to the primary volume 4.

Upon the replication engine 12 receiving (at block 178) from the splitter 10 the copy replication command 98 with the data to replicate 100, the replication engine 12 determines (at block 180) a copy service 16 function to use to copy the received data. In one embodiment, the copy service 16 may be determined from the primary volume metadata 28 the replication engine 12 maintains for the primary volume or may be indicated in the replication command sent from the splitter 10. The replication engine 12 may execute (at block 182) the determined copy service 16 function to transfer the received data to the corresponding replication engine volume 18, which may be indicated in the field 74 of the primary volume metadata 28 (FIG. 3) maintained by the replication engine 12. Upon completing the copying, the replication engine 12 sends (at block 184) a message, comprising one replication command 98, to the splitter 10 that the write of the data completed. Upon receiving (at block 186) complete from the replication engine 12 for the transferred data, the splitter 10 sends (at block 188) a message to the host 2 initiating the write request that write of the data completed.

Figure 8:
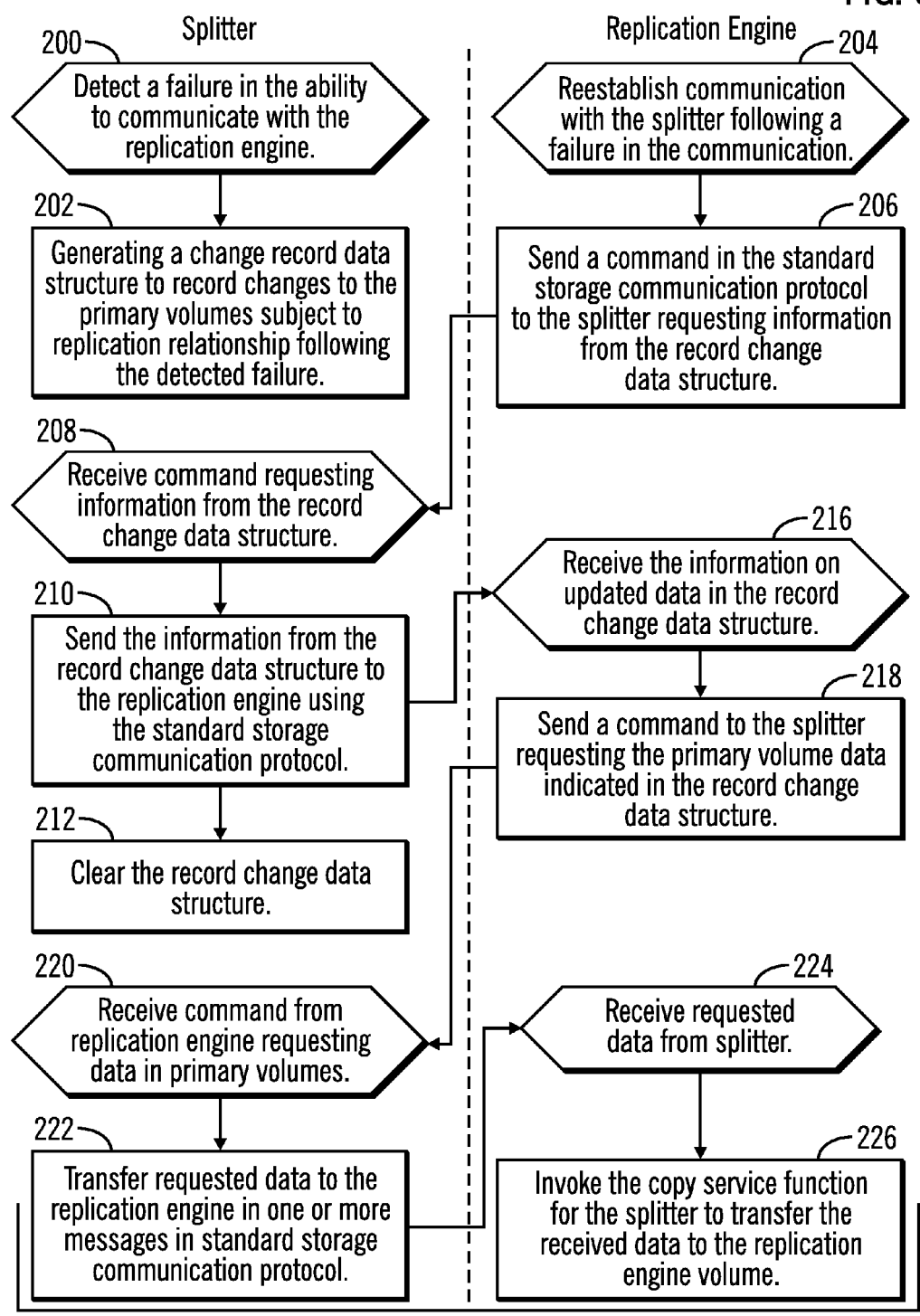
FIG. 8 illustrates an embodiment of operations to handle a communication failure between the splitter and the replication engine.

FIG. 8 illustrates an embodiment of operations performed by the splitter 10 and replication engine 12 to handle a failure in communication between the splitter 10 and the replication engine 12, such as a network 22 failure. Upon detecting (at block 200) a failure in the ability to communicate with the replication engine 12, the splitter 10 generates (at block 202) a change record data structure 58 for each primary volume in a replication relationship, as indicated by the replication flag 54 being set, to record changes to the primary volume 4 subject to replication following the detected failure. In a further embodiment, the splitter 10 may maintain a global data structure for a set of volumes. Upon reestablishing (at block 204) communication with the splitter 10 following a failure in the communication, the replication engine 12 generates and sends (at block 206) a replication command 98 in the standard storage communication protocol package 94 to the splitter 10 requesting information from the record change data structure 58 (which may comprise a copy of the record change data structure 58 or information extracted from the data structure 58). In response to receiving (at block 208) the replication command request for the record change data structure 58, the splitter 10 sends (at block 210) information from the record change data structure 58 to the requesting replication engine 12 using the standard storage communication protocol 94. The sent information may indicate those regions of the primary volumes subject to replication that were updating during the communication failure. Upon sending the replication engine 12 information on the record change data structure 58, the splitter 10 may further clear (at block 212) the record change data structure 58. Upon the replication engine 12 receiving (at block 216) the information from the record change data structure 58, the replication engine 12 sends (at block 218) one or more packages 94 of a command to the splitter 10 requesting the data updated in the primary volume 4 during the communication failure.

In response to receiving (at block 220) the replication command 98 from the replication engine 12 requesting data in the primary volume 4 whose data was identified in the record change data structure 58, the splitter 10 transfers (at block 222) the requested data to the replication engine 12 in one or more messages in a standard storage communication protocol package 94. Upon receiving (at block 224) the requested data from the splitter 10, the replication engine 12 invokes (at block 226) the copy service 76 function for the splitter 10 to transfer the received data to the corresponding replication engine volume 18. The replication engine volume 18 corresponding to a primary volume 4 may be determined from the fields 72 and 74 in the primary volume metadata 28 maintained by the replication engine 12. In a further embodiment, when a resynchronization of the other regions is performed, the replication engine 12 may run the specific function that is required for the recovery procedure.

Figure 9:
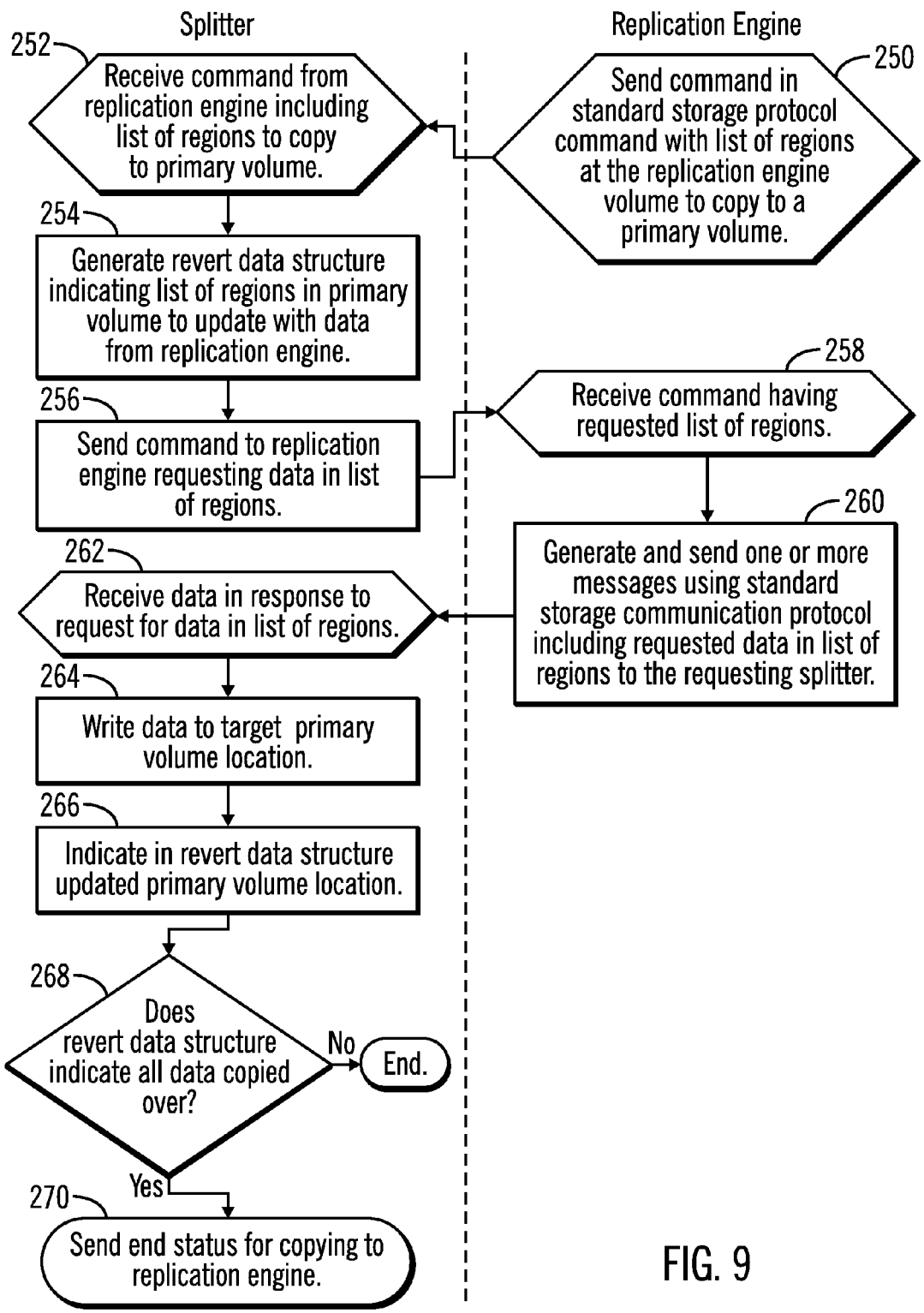
FIG. 9 illustrates an embodiment of operations to copy data from the replication engine volume to the primary volume.

FIG. 9 illustrates an embodiment of operations performed by the splitter 10 and replication engine 12 to copy regions from the replication engine volume 18 to a primary volume 4. The replication engine 12 sends (at block 250) a command in standard storage protocol package 94 with list of regions at the replication engine volume 18 to copy to a primary volume 4. In response to receiving (at block 252) the copy command with the list of regions, the splitter 10 generates (at block 254) a revert data structure 60 (FIG. 2) for the target primary volume 4 indicating a list of regions in the primary volume to update with data from the replication engine 12. The splitter 10 sends (at block 256) a replication command 98 in a storage communication protocol package 94 and network package 90 to the replication engine 12 requesting data in the list of regions indicated in the revert data structure 60.

Upon receiving (at block 258) the replication command from the splitter 10 requesting the list of regions, the replication engine 12 generates and sends (at block 260) to the splitter 10 one or more messages using the standard storage communication protocol package 94, and network package 90. The splitter 10, upon receiving (at block 262) the data, writes (at block 264) the data to the target primary volume 4. The splitter 10 indicates (at block 266) in the revert data structure 60 the primary volume locations updated with the data from the replication engine volume 18. If (at block 268) the revert data structure 60 indicates that all the indicated data was copied over, i.e., all the list of regions were copied from the replication engine volume 18 to the primary volume 4, then the splitter 10 sends (at block 270) an end status to the replication engine 12 indicating that the list of regions were copied from the replication engine volume 18 to the target primary volume 4. Otherwise, if (at block 268) the revert data structure 60 indicates that there are further regions to copy over, control ends.

Figure 10:
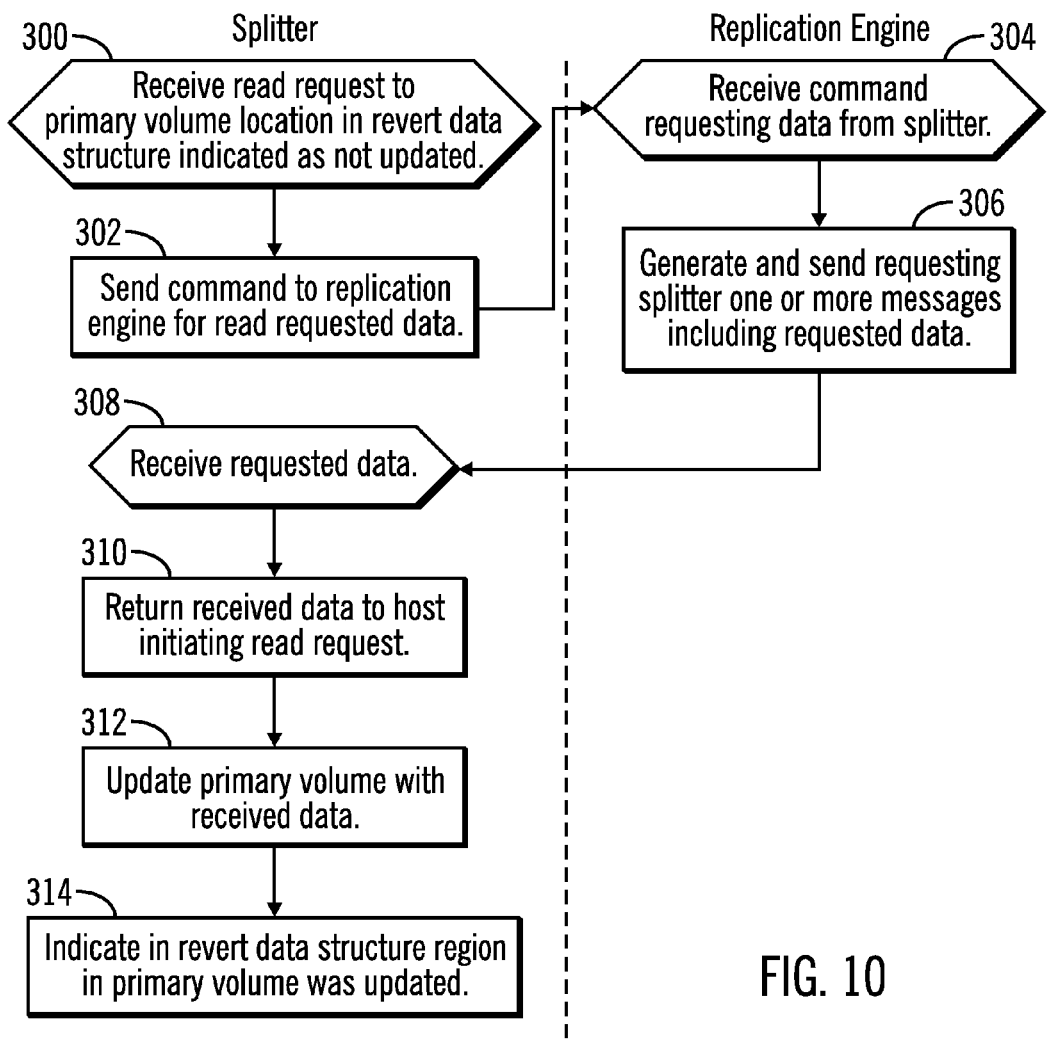
FIG. 10 illustrates an embodiment of operations to process a read request to a region of the primary volume to be updated with data from the replication engine volume.

FIG. 10 illustrates an embodiment of operations performed by the splitter 10 and replication engine 12 to handle read requests to a primary volume 4 having regions indicated in the revert data structure 60 to be updated with data from a replication engine volume 18. Upon the splitter 10 receiving (at block 300) a read request from a host 2 to a primary volume 4 location indicated in revert data structure 60 indicated as not updated, or waiting to be updated, the splitter 10 sends (at block 302) a replication command 98 to the replication engine 12 for the read requested data. Upon receiving (at block 304) the request for the read requested data, the replication engine 12 generates and sends (at block 306) the requesting splitter 10 one or more messages including the requested data, such as in the data field 100 of the standard storage communication package 94 within a network package 90.

Upon receiving (at block 308) the requested data, the splitter 10 returns (at block 310) the received data to the host 2 initiating the read request and updates (at block 312) the primary volume 4 with the received data. The splitter 10 further indicates (at block 314) in the revert data structure 60 that the region in the primary volume 4 was updated.

Figure 11:
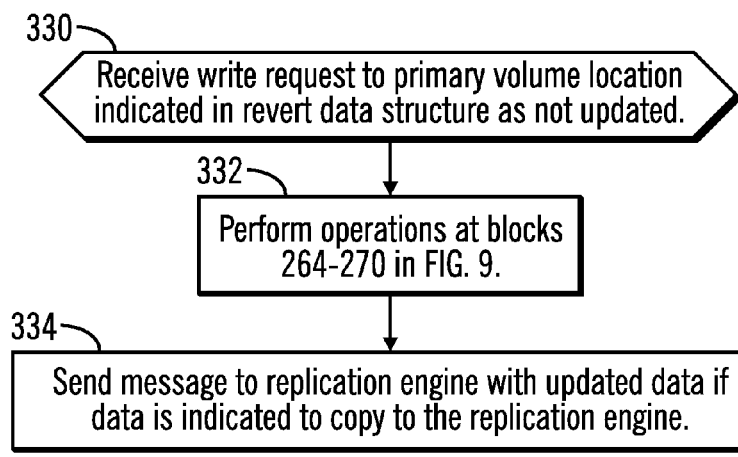
FIG. 11 illustrates an embodiment of operations to process a write request to a region of the primary volume to be updated with data from the replication engine volume

FIG. 11 illustrates an embodiment of operations performed by the splitter 10 to handle a write request from a host 2 to a region indicated in a revert data structure 60 as waiting for data from a replication engine volume 18. Upon the splitter 10 receiving (at block 330) a write request to a primary volume location indicated in the revert data structure 60 as not updated, the splitter 10 performs (at block 332) the operations at blocks 264-270 in FIG. 9 to update the data with the new write data. The splitter 10 further sends a replication message to the replication engine 12 with the updated data if the data is indicated to copy to the replication engine 12.

Figure 12:
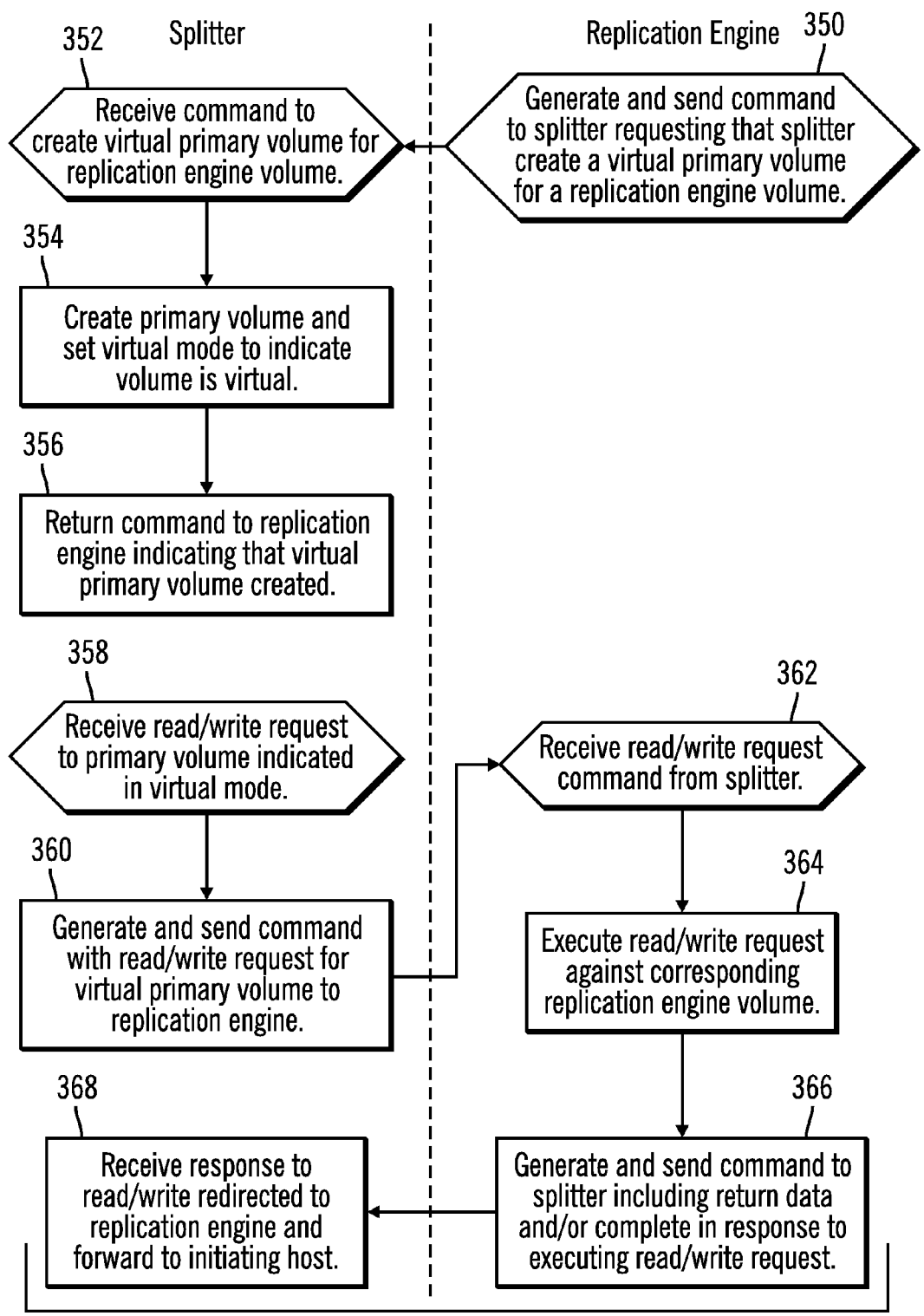
FIG. 12 illustrates an embodiment of operations to create a virtual primary volume associated with a replication engine volume.

FIG. 12 illustrates an embodiment of operations performed by the splitter 10 and replication engine 12 to manage a virtual primary volume 4 exposing a replication engine volume 18 to the hosts 2. The replication engine 12 (or some other component) may generate and send (at block 350) a replication command 98 to the splitter 10 requesting that splitter 10 create a virtual primary volume for a replication engine volume 18. The replication engine primary volume metadata 28 may indicate the virtual primary volume 72, corresponding replication engine volume 74 exposed through the virtual primary volume 72, and a virtual mode 78. Upon receiving (at block 352) the command to create the virtual primary volume, the splitter 10 creates (at block 354) a virtual primary volume by creating primary volume metadata 26 indicating the new virtual primary volume 52 with the virtual mode 62 set to indicate that the primary volume 52 is virtual. The splitter 10 returns (at block 356) a replication message 98 indicating that the requested virtual primary volume was created.

Upon the splitter 10 receiving (at block 358) a read/write request directed to a primary volume indicated in virtual mode 62, the splitter 10 generates and sends (at block 360) a command 98 with the read/write request for the virtual primary volume to the replication engine 12. The replication engine 12 receives (at block 362) the command and executes (at block 364) the read/write request against the corresponding replication engine volume 18, indicated in the metadata 28 as associated with the primary volume 72. The replication engine 12 generates and sends (at block 366) a command 98 to the splitter 10 including return data and/or complete in response to executing the read/write request against the replication engine volume 18. The splitter 10 forwards (at block 368) the returned data or complete to the requesting host 2.

Described embodiments provide techniques to enable data transfer operations between a splitter in a storage controller managing access to primary volumes and a replication engine managing access to replication engine volumes. The described embodiments provide techniques for the splitter to communicate with different replication engines implementing the replication command set. The replication engine 10 may invoke a copy service for the splitter in the storage controller splitting writes to the primary volume to a replication engine volume.

Additional Embodiment Details

The described operations may be implemented as a method, apparatus or article of manufacture using standard programming and/or engineering techniques to produce software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the present invention, and that the article of manufacture may comprise suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 5-12 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Figure 13:
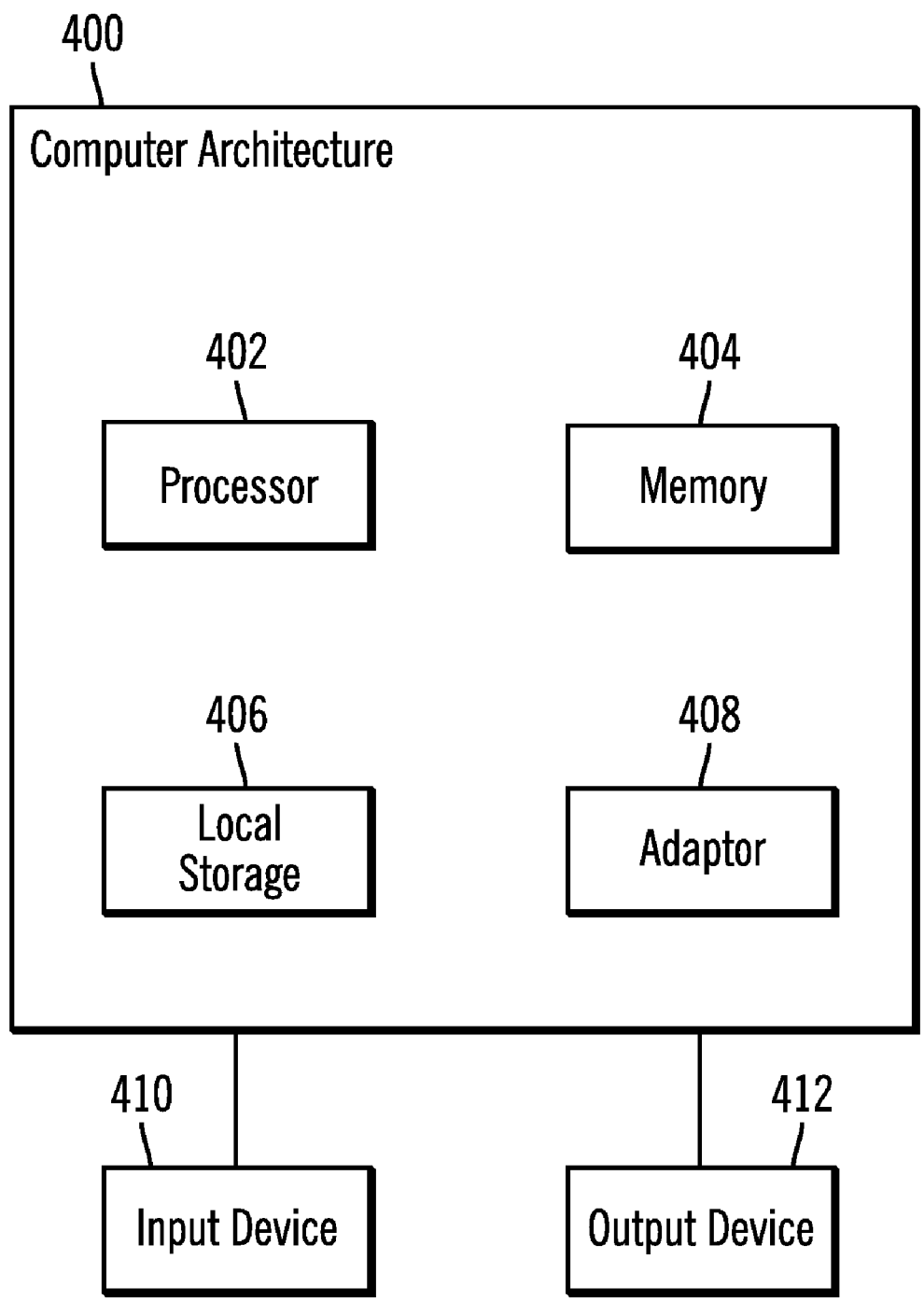
FIG. 13 illustrates a block diagram of a computer architecture in which certain described aspects of the embodiments are implemented

FIG. 13 illustrates an embodiment of computing system architecture 400 that may be implemented, in whole or in part, in the devices 2, 8, and 14 (FIG. 1). The architecture 400 may include one or more processors 402 (e.g., a microprocessor), a memory 404 (e.g., a volatile memory device), and storage 406 (e.g., a non-volatile storage, such as magnetic disk drives, optical disk drives, a tape drive, etc.). The storage 406 may comprise an internal storage device or an attached or network accessible storage. Programs in the storage 406 are loaded into the memory 404 and executed by the processor(s) 402 in a manner known in the art. The architecture further includes one or more adaptors 408 to enable communication over a network. An input device 410 may be used to provide user input to the processor 402, and may include a keyboard, mouse, pen-stylus, microphone, touch sensitive display screen, or any other activation or input mechanism known in the art. An output device 412 is capable of rendering information transmitted from the processor 402, or other component, such as a display monitor, printer, storage, etc.

The foregoing description of various embodiments of the invention has been presented for the purposes of illustration and description. It is not intended to be exhaustive or to limit the invention to the precise form disclosed. Many modifications and variations are possible in light of the above teaching.

It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method to replicate data performed by a splitter executing in a storage controller managing access to primary volumes, comprising:
   receiving an initialization command to communicate with a replication engine;
   receiving a replication command for one primary volume to split data for the primary volume to the replication engine;
   indicating in primary volume metadata, in response to the replication command, the primary volume as subject to replication and the replication engine to which the data in the primary volume is split, wherein the replication engine is indicated directly in the primary volume metadata;
   receiving a write request to write data to a target primary volume of the primary volumes that is indicated in the primary volume metadata for the target primary volume as subject to the replication;
   writing the data in the write request to the target primary volume; and
   sending the data in the write request to the replication engine indicated in the primary volume metadata for the target primary volume, wherein the replication engine executes a copy services function associated with the target primary volume to write the data to a replication engine volume, wherein the replication engine and the replication engine volume communicate from different locations over a network.

2. The method of claim 1, wherein there are a plurality of replication engines each implementing heterogeneous copy functions from different vendors, further comprising:
   using, by the splitter, a same set of commands to communicate with the different replication engines to invoke the heterogeneous copy functions.

3. The method of claim 1, further comprising:
   returning complete to the write request in response to receiving acknowledgment that the write completed at both the primary volume and at the replication engine volume.

4. The method of claim 1, further comprising:
   detecting a failure in communicating with the replication engine;
   recording indications in a record change data structure of writes to the primary volume that occur following the detected failure;
   receiving a request from the replication engine for the record change data structure;
   sending information on changed data in the record change data structure to the replication engine; and
   clearing the record change data structure in response to sending the record change data structure to the replication engine.

5. The method of claim 1, further comprising:
   receiving indication of a region to copy from the replication engine to the primary volume;
   requesting from the replication engine data indicated in the region;

receiving data from replication engine indicated in the region;

writing the received data indicated in the region to the primary volume; and indicating that the data in the region was written to the primary volume in response to writing the data received from the replication engine to the primary volume.

6. The method of claim 5, wherein the receiving the indication of the region comprises receiving a list of regions to copy from the replication engine to the primary volume, further comprising:

receiving a read request to data in the primary volume after receiving the list of regions;

determining whether the read requested data is indicated in the list;

redirecting the read request to the replication engine in response to determining that the read requested data is indicated in the list; and returning the read requested data from the primary volume in response to determining that the read requested data is not indicated in the list.

7. The method of claim 5, further comprising:

receiving a write request to write data to the primary volume after receiving the region;

determining whether the data to write is indicated in the region; and indicating that the data from the write request in the region was written to the primary volume in response to writing the data to the primary volume.

8. The method of claim 1, further comprising:

receiving a command to create a virtual primary volume associated with a replication engine volume;

creating a virtual primary volume accessible to a host;

receiving an Input/Output (I/O) request directed to the virtual primary volume;

directing the I/O request directed to the virtual primary volume to the replication engine.

9. A system managing access to primary volumes and communicating in a network including a replication engine and a replication engine volume, comprising:

a computer readable medium having primary volume metadata; and a splitter enabled to cause operations, the operations comprising:

receiving an initialization command to communicate with the replication engine;

receiving a replication command for one primary volume to split data for the primary volume to the replication engine;

indicating in the primary volume metadata, in response to the replication command, that the primary volume is subject to replication and the replication engine to which the data in the primary volume is split, wherein the replication engine is indicated directly in the primary volume metadata;

receiving a write request to write data to a target primary volume of the primary volumes that is indicated in the primary volume metadata for the target primary volume as subject to the replication;

writing the data in the write request to the target primary volume; and sending the data in the write request to the replication engine indicated in the primary volume metadata for the target primary volume, wherein the replication engine executes a copy services function associated with the target primary volume to write the data to a replication engine volume, wherein the replication engine and the replication engine volume communicate from different locations over the network.

10. The system of claim 9, wherein the splitter further causes operations comprising:

detecting a failure in communicating with the replication engine;

recording indications in a record change data structure of writes to the primary volume that occur following the detected failure;

receiving a request from the replication engine for the record change data structure;

sending information on changed data in the record change data structure to the replication engine; and clearing the record change data structure in response to sending the record change data structure to the replication engine.

11. The system of claim 9, wherein the splitter further causes operations comprising:

receiving indication of a region to copy from the replication engine to the primary volume;

requesting from the replication engine data indicated in the region;

receiving data from replication engine indicated in the region;

writing the received data indicated in the region to the primary volume; and indicating that the data in the region was written to the primary volume in response to writing the data received from the replication engine to the primary volume.

12. The system of claim 11, wherein the receiving the indication of the region comprises receiving a list of regions to copy from the replication engine to the primary volume, and wherein the splitter further causes operations comprising:

receiving a read request to data in the primary volume after receiving the list of regions;

determining whether the read requested data is indicated in the list;

redirecting the read request to the replication engine in response to determining that the read requested data is indicated in the list; and returning the read requested data from the primary volume in response to determining that the read requested data is not indicated in the list.

13. The system of claim 9, wherein the splitter further causes operations comprising:

receiving a command to create a virtual primary volume associated with a replication engine volume;

creating a virtual primary volume accessible to a host;

receiving an Input/Output (I/O) request directed to the virtual primary volume;

directing the I/O request directed to the virtual primary volume to the replication engine.

14. An article of manufacture comprising a computer readable medium storing splitter code executed by a storage controller to communicate in a network including a replication engine and a replication engine volume, to manage access to primary volumes, and to cause operations to be performed, the operations comprising:

receiving an initialization command to communicate with the replication engine;

receiving a replication command for one primary volume to split data for the primary volume to the replication engine;

indicating in primary volume metadata, in response to the replication command, the primary volume as subject to replication and the replication engine to which the data in the primary volume is split, wherein the replication engine is indicated directly in the primary volume metadata;

receiving a write request to write data to a target primary volume of the primary volumes that is indicated in the primary volume metadata for the target primary volume as subject to the replication;

writing the data in the write request to the target primary volume; and sending the data in the write request to the replication engine indicated in the primary volume metadata for the target primary volume, wherein the replication engine executes a copy services function associated with the target primary volume to write the data to a replication engine volume, wherein the replication engine and the replication engine volume communicate from different locations over the network.

15. The article of manufacture of claim 14, wherein there are a plurality of replication engines each implementing heterogeneous copy functions from different vendors, wherein the operations further comprise:

using a same set of commands to communicate with the different replication engines to invoke the heterogeneous copy functions.

16. The article of manufacture of claim 14, wherein the operations further comprise:

returning complete to the write request in response to receiving acknowledgment that the write completed at both the primary volume and at the replication engine volume.

17. The article of manufacture of claim 14, wherein the operations further comprise:

detecting a failure in communicating with the replication engine;

recording indications in a record change data structure of writes to the primary volume that occur following the detected failure;

receiving a request from the replication engine for the record change data structure;

sending information on changed data in the record change data structure to the replication engine; and clearing the record change data structure in response to sending the record change data structure to the replication engine.

18. The article of manufacture of claim 14, wherein the operations further comprise:

receiving indication of a region to copy from the replication engine to the primary volume;

requesting from the replication engine data indicated in the region;

receiving data from replication engine indicated in the region;

writing the received data indicated in the region to the primary volume; and indicating that the data in the region was written to the primary volume in response to writing the data received from the replication engine to the primary volume.

19. The article of manufacture of claim 18, wherein the receiving the indication of the region comprises receiving a list of regions to copy from the replication engine to the primary volume, and wherein the operations further comprise:

receiving a read request to data in the primary volume after receiving the list of regions;

determining whether the read requested data is indicated in the list;

redirecting the read request to the replication engine in response to determining that the read requested data is indicated in the list; and returning the read requested data from the primary volume in response to determining that the read requested data is not indicated in the list.

20. The article of manufacture of claim 18, wherein the operations further comprise:

receiving a write request to write data to the primary volume after receiving the region;

determining whether the data to write is indicated in the region; and indicating that the data from the write request in the region was written to the primary volume in response to writing the data to the primary volume.

* * * * *